United States Patent Office 2,955,980
Patented Oct. 11, 1960

2,955,980
METHOD OF REPELLING BIRDS COMPRISING APPLYING A SULFINAMIDE

Lyle D. Goodhue and Rector P. Louthan, Bartlesville, and Kenneth E. Cantrel, Dewey, Okla., assignors to Phillips Petroleum Company, a corporation of Delaware No Drawing. Filed Dec. 1, 1958, Ser. No. 777,177

19 Claims. (Cl. 167—46)

This invention relates to a method for repelling birds. In one aspect, the invention relates to a method for rendering surfaces repellent to birds.

This application is a continuation in part of Serial No. 699,908, filed December 2, 1957, now abandoned.

A number of repellents for certain pests, such as insects and rodents, have been developed and are known in the art. However, very little success has been attained in the search for a material which is repellent to birds. It is desirable from many applications to repel birds from certain areas and surfaces. For instance, the loss of grain at the present time because of consumption by birds represents a large financial loss in this country each year. Also, as is well known, many birds are architectural pests.

It is thus an object of the invention to provide an improved method for repelling birds. It is another object of the invention to provide a method for rendering surfaces repellent to birds.

Other objects, as well as aspects and advantages of the invention, will be apparent from a study of this disclosure.

We have now discovered that birds are repelled by compounds of the formula

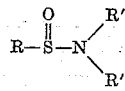

wherein R is selected from the group consisting of alkaryl, aralkyl, aryl and alkyl hydrocarbon radicals containing from 1 to 16 carbon atoms, R' is selected from the group consisting of hydrogen and an alkyl radical containing from 1 to 10 carbon atoms, R" is selected from the group consisting of alkyl radicals containing from 1 to 10 carbon atoms and

wherein R is as previously defined, and wherein R' and R" can, together with the nitrogen, form a heterocyclic ring, in which case the radical comprising the combined R' and R" are selected from the group consisting of

—CH$_2$—CH$_2$—CH$_2$—CH$_2$—CH$_2$—,
—CH$_2$—CH$_2$—O—CH$_2$—CH$_2$—, and —CH$_2$—CH$_2$—S—CH$_2$—CH$_2$—. Usually R, R' and R" contain 1 to 8 carbon atoms. Also, the total carbon atoms in the compound is usually not over 18.

Some examples of specific compounds of the above general formula which can be employed as bird repellents are:

N,N-dimethyl-tert-octanesulfinamide;
N,N-diethyl-tert-octanesulfinamide;
N,N-diisopropyl-tert-octanesulfinamide;
N,N-dimethyl-tert-hexanesulfinamide;
N,N-diethyl-tert-hexanesulfinamide;
N,N-di-n-propyl-tert-hexanesulfinamide;
N-methyl-N-ethyl-tert-octanesulfinamide;
N-ethyl-N-n-propyl-tert-hexanesulfinamide;
N-methyl-bis(tert-octanesulfinamide);
N-ethyl-bis(tert-octanesulfinamide);
N-isopropyl-bis(tert-hexanesulfinamide);
N,N-di-n-propyl-tert-octanesulfinamide;
N,N-diisopropyl-tert-hexanesulfinamide;
N-ethyl-tert-octane tert-hexanesulfinamide;
N,N-pentamethylene-tert-octane sulfinamide;
N,N-di-n-butylmethanesulfinamide;
N,N-di-n-heptylmethanesulfinamide;
N,N-4-oxapentamethylenemethanesulfinamide;
N,N-pentamethylene methanesulfinamide;
N,N-di-n-butylethanesulfinamide;
N,N-di-n-butyl-n-propanesulfinamide;
N,N-di-n-butyl-n-butanesulfinamide;
N,N-di-n-butylisobutanesulfinamide;
N,N-di-n-butyl-tert-butanesulfinamide;
N,N-di-n-butyl-sec-butanesulfinamide;
N,N-diisobutyl-tert-octanesulfinamide;
N,N-di-n-butylbenzensulfinamide;
N,N-di-n-butyl-(phenylethane)sulfinamide,
N,N-dimethyl-n-hexadecanesulfinamide;
N,N-diethyl-p-toluenesulfinamide;
N,N-di-n-butyl-10-phenyldecanesulfinamide;
N-n-decyl-benzenesulfinamide;
N-methyl-N-n-octyl-3-n-butylbenzenesulfinamide;
N-n-decyl-bis(n-decanesulfinamide);
bis(10-phenyldecanesulfinamide);
N,N-4-oxapentamethylene-n-decanesulfinamide;
N,N-4-thiapentamethylene-2-n-nonylphenylsulfinamide;
and N,N-pentamethylene-8-phenyloctanesulfinamide.

Two or more of the sulfinamides of the herein disclosed formula can be employed together in the process of the invention.

A very useful sub-class of compounds, useful according to my invention for repelling birds and coming within the broad class of sulfinamides disclosed herein are compounds of the formula

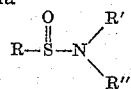

wherein R is selected from the group consisting of tert-octyl and tert-hexyl radicals, R' is selected from the group consisting of methyl, ethyl, n-propyl, and isopropyl radicals, and R" is selected from the group consisting of methyl, ethyl, n-propyl and isopropyl radicals and the radical

wherein R''' is selected from the group consisting of tertiary octyl and tertiary hexyl radicals, and wherein, when R' is alkylene, R" is also alkylene and R' and R" together form a polyalkylene group having from 4 to 5 carbon atoms.

The bird repellents of this invention can be applied for their intended purpose as the pure compound, or in combination with a carrier or inert materials as in solution or emulsion. Solvents or carriers should be used which are substantially inert with respect to the active repellent. Some examples of carrier materials which can be employed are acetone, deodorized kerosene, naphthas, isoparaffinic hydrocarbon fractions boiling in the approximate range of 260 to 800° F. (Soltrol), and the like. If desired, the bird repellents of this invention can be applied as aqueous emulsions, in which case a suitable emulsifying or wetting agent is employed. The repellent materials can also be applied as a dust, using such solid carriers as kieselguhr, and the like. In addition, the materials for repelling birds can be applied to surfaces from which it is desired to repel these animals in conjunction with an adhesive.

The bird repellents of this invention can be applied in the above-described forms by spraying, brushing, dusting, etc. The usually preferred method of application is by spraying a liquid composition on the surface to be treated. When applying the repellents of this invention in a solvent or carrier, the liquid compositions normally contain from 0.1 to 10 weight percent of one of the described alkanesulfinamides, although concentrations above and below this range can be used. When these materials are applied in the form of dust, the concentration of the active ingredient is preferably within the range between 1 and 20 weight percent, although concentrations above and below this range are applicable.

The bird repellents of this invention are usually applied to a surface in a manner so as to deposit an amount within the range between 1 and 10 grams of the active repellent material per each 100 square feet of surface from which birds are to be repelled. Larger or smaller amounts can be applied, if desired, although larger amounts are generally uneconomical.

One method of preparation of the N,N-dialkyl-tert-alkanesulfinamides of the invention is to react a tertiary alkyl sulfenyl halide with a secondary amine. The reaction can be suitably carried out in a dispersing medium such as a hydrocarbon, for instance n-pentane, by contacting the reactants therein at room temperature. After the sulfenamide has been prepared a peroxide such as hydrogen peroxide can be added to the reaction mixture to oxidize the sulfenamide to the sulfinamide.

The bird repellents of this invention can be applied to many different types of surfaces which it is desired to render repellent to birds. For example, these materials can be applied to grain, fruit trees, seeds, tree seedlings, window ledges and the like.

The following examples illustrate the method of the invention, but are not intended to limit the scope of the invention.

EXAMPLE I

A number of runs were made in which certain alkane sulfinamides were tested as repellents for baby chickens. In these runs, a solution of either ½ gram or 1 gram of the desired sulfinamide in 20 cc. of acetone was applied to 100 grams of chicken feed. The chicken feed was thoroughly mixed with this solution, after which the acetone was evaporated from the feed. Fifty grams of this feed was then placed in a cage with 2 hungry baby chickens, and the grams of treated feed remaining at the end of three days was determined. Untreated feed was completely consumed before the end of the first day. The results of these runs are expressed below as Table I.

*Table I*

| Run No. | Alkanesulfinamide Employed | Grams of Compound applied per 100 grams of feed | Grams of Feed Left | | |
|---|---|---|---|---|---|
| | | | Estimated | | Actual |
| | | | 1st day | 2nd day | 3rd day |
| 1 | N,N-dimethyl-tert-octanesulfinamide | 0.5 | (¹) | (¹) | 25 |
| 2 | ___do___ | 1.0 | 47 | 46 | 27 |
| 3 | N,N-diethyl-tert-octanesulfinamide | 0.5 | (¹) | (¹) | 25 |
| 4 | ___do___ | 1.0 | 47 | 47 | 39 |
| 5 | N,N-pentamethylene-tert-octanesulfinamide | 1.0 | (¹) | (¹) | 25 |
| 6 | N,N-diisopropyl-tert-octanesulfinamide | 0.5 | (¹) | (¹) | 11 |
| 7 | N-ethyl-bis(tert-octanesulfinamide) | 1.0 | 45 | 40 | 27 |
| 8 | N,N-dimethyl-tert-hexanesulfinamide | 0.5 | (¹) | (¹) | 16 |
| 9 | N,N-di-n-butylmethanesulfinamide | 1.0 | (¹) | (¹) | 2 |
| 10 | N,N-di-n-heptylmethanesulfinamide | 1.0 | 30 | 0 | |
| 11 | N,N-4-oxapentamethylene methanesulfinamide | 1.0 | 15 | 0 | |
| 12 | N,N-pentamethylenemethanesulfinamide | 1.0 | 20 | 17 | 4 |
| 13 | N,N-di-n-butylethanesulfinamide | 1.0 | 42 | 35 | 13 |
| 14 | N,N-di-n-butyl-n-propanesulfinamide | 1.0 | 40 | 37 | 14 |
| 15 | N,N-di-n-butyl-n-butanesulfinamide | 1.0 | 42 | 40 | 15 |
| 16 | N,N-di-n-butylisobutanesulfinamide | 1.0 | 42 | 20 | 0 |
| 17 | N,N-di-n-butyl-tert-butanesulfinamide | 1.0 | 45 | 25 | 4 |
| 18 | N,N-di-n-butyl-sec-butanesulfinamide | 1.0 | 47 | 40 | 20 |

¹ Not established.

EXAMPLE II

A run was also made in which an alkanesulfinamide falling within the scope of the present invention was tested as a repellent for parakeets. In this test, treated parakeet feed was made up in the same manner as described in Example I, using 0.5 gram of N,N-dimethyl-tert-octanesulfinamide per 100 grams of parakeet feed. In one side of the parakeet cage, untreated feed was supplied and the other feed station contained the treated parakeet feed. The treated feed was untouched for 14 days, while it was necessary to add more of the untreated feed as it was consumed.

EXAMPLE III

In still another run, 500 grams of maize was treated with one gram of N,N-dimethyl-tert-octanesulfinamide dissolved in just enough acetone to barely wet the grain. This treated grain was kept in a sealed pint jar for several days, after which it was put out at various feeding stations in an area frequented by several species of birds. Untreated grain was also put out at other feeding stations in the area. The untreated grain had to be replaced frequently while the treated maize was hardly touched for three months. After this three months period was over the treated material was gradually consumed. The consumption of the treated grain took place late in the fall and this could have been due not only to loss in effectiveness of the repellent, but to the pressure of hunger since very little natural bird food was available during this season.

EXAMPLE IV

Another series of runs were carried out in which the sulfinamides of this invention were tested as repellents for Coturnix quail.

In these tests, 100 grams of feed was treated with a solution of one gram of one of the sulfinamides in 40 cc. of acetone. The solvent was then evaporated, and the dried feed was placed in a cage with four Coturnix quail. As in Example I, the amount of feed gone on the first and second days was estimated, and the amount remaining on the third day was determined by weighing, unless all the feed had been eaten. The quail ate all of the 100 grams on the first day in a control using untreated feed. The results are expressed below as Table II.

*Table II*

| Run No. | Compound | Grams of Feed Gone | | |
|---|---|---|---|---|
| | | Estimated | | Actual |
| | | 1st day | 2nd day | 3rd day |
| 19 | N,N-dimethyl-tert-octanesulfinamide | | | 12 |
| 20 | N,N-diethyl-tert-octanesulfinamide | | | 12 |
| 21 | N,N-diisopropyl-tert-octanesulfinamide | 5 | 35 | 60 |
| 22 | N,N-di-n-butyl-tert-octanesulfinamide | 10 | 50 | 100 |
| 23 | N-ethyl-bis(tert-octanesulfinamide) | 20 | 50 | 55 |
| 24 | N,N-di-n-butylisobutanesulfinamide | 20 | 70 | 100 |
| 25 | N,N-4-oxapentamethylene-tert-octanesulfinamide | 0 | 15 | 50 |
| 26 | N,N-di-n-propyl-tert-octanesulfinamide | 20 | 70 | 82 |
| 27 | N-tert-butyl-tert-octanesulfinamide | 30 | 75 | 80 |
| 28 | N,N-diisobutyl-tert-octanesulfinamide | 20 | 100 | |
| 29 | N,N-di-n-butylbenzenesulfinamide | 10 | 20 | |
| 30 | N,N-di-n-butyl(phenylethane)sulfinamide | 10 | 60 | 64 |
| 43 | N,N-dimethyl-tert-butanesulfinamide | 40 | 90 | 100 |
| 44 | N,N-dimethylethanesulfinamide | 60 | 100 | |
| 45 | N,N-dimethyl-n-butanesulfinamide | 10 | 70 | 100 |
| 46 | N,N-dimethyl-tert-dodecanesulfinamide | 60 | 100 | |
| 47 | N,N-dimethyl-tert-heptanesulfinamide | 10 | 50 | 64 |
| 48 | N,N-di-n-butylmethanesulfinamide | 30 | 85 | 93 |

EXAMPLE V

Several of the sulfinamides of this invention were tested as bird repellents in field plots. In these tests, grain was treated with the repellent in the manner described in Examples I and II. Pans of these treated grains were set out in fields infested with birds, and controls (untreated) were interspersed among the pans containing treated grain. The results at the end of 2 months are expressed below as Table III

*Table III*

| Run No. | Compound | Amount of Repellent on Grain, Wt. Percent | Average Amount of Grain Eaten, Wt. Percent |
|---|---|---|---|
| 31 | N,N-dimethyl-tert-octanesulfinamide. | 1.0 | 50 |
| 32 | do | 0.5 | 75 |
| 33 | N,N-diethyl-tert-octanesulfinamide. | 1.0 | 15 |
| 34 | do | 0.25 | 23 |
| 35 | N,N-di-n-butylmethanesulfinamide. | 1.0 | 17 |
| 36 | do | 0.25 | 26 |
| 37 | N,N-diisopropyl-tert-octanesulfinamide. | 1.0 | 8 |
| 38 | do | 0.25 | 16 |
| 39 | N,N-di-n-butyl-tert-octanesulfinamide. | 1.0 | 6 |
| 40 | do | 0.25 | 4 |
| 41 | N-ethyl-bis(tert-octanesulfinamide). | 1.0 | 33 |
| 42 | N,N-di-n-heptylmethanesulfinamide. | 1.0 | 38 |

EXAMPLE VI

In other tests, plots of sorghum were sprayed just as the sorghum began to "head up" with a one percent by weight emulsion of N,N-diethyl-tert-octane-sulfinamide. Two months later, the heads of the treated grain weighed 45 percent more than untreated heads based on the average of 100 heads due to more grain being present in the heads. Similar runs with a 2 percent by weight emulsion caused an increase of 106 percent.

In another series of tests of this type, a one percent emulsion of N,N-di-n-butyl-tert-octanesulfinamide caused an increase of 119%.

As will be evident to those skilled in the art, various modifications of this invention can be made or followed in the light of the foregoing disclosure and discussion without departing from the spirit or scope of the disclosure or from the scope of the claims.

We claim:

1. A method of repelling birds which comprises subjecting the locus from which the birds are to be repelled to the action of at least one compound of the formula

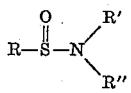

wherein R is selected from the group consisting of alkaryl, aralkyl, aryl and alkyl hydrocarbon radicals containing from 1 to 16 carbon atoms, R' is selected from the group consisting of hydrogen and an alkyl radical containing from 1 to 10 carbon atoms, R" is selected from the group consisting of alkyl radicals containing from 1 to 10 carbon atoms and

wherein R is as previously defined, and wherein R' and R" can, together with the nitrogen, form a heterocyclic ring, in which case the radical comprising the combined R' and R" are selected from the group consisting of

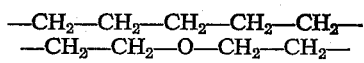
and
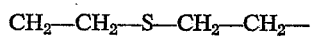

2. A method according to claim 1 wherein said compound is: N,N-dimethyl-tert-octanesulfinamide.
3. A method according to claim 1 wherein the compound is N,N-diethyl-tert-octanesulfinamide.
4. A method according to claim 1 wherein said compound is: N,N-pentamethylene-tert-octanesulfinamide.
5. A method according to claim 1 wherein said compound is N,N-diisopropyl-tert-octanesulfinamide.
6. A method according to claim 1 wherein said compound is N-ethyl-bis(di-tert-octanesulfinamide).
7. A method according to claim 1 wherein said compound is N,N-dimethyl-tert-hexanesulfinamide.
8. A method according to claim 1 wherein said compound is N,N-di-n-butylmethanesulfinamide.
9. A method according to claim 1 wherein said compound is N,N-di-n-butyl-tert-octanesulfinamide.
10. A method according to claim 1 wherein said compound is N,N-di-n-heptylmethanesulfinamide.
11. A method according to claim 1 wherein said compound is N,N-di-n-butyl-n-propanesulfinamide.
12. A method according to claim 1 wherein said compound is N,N-di-n-butyl-n-butanesulfinamide.
13. A method according to claim 1 wherein said compound is N,N-di-n-butylisobutanesulfinamide.
14. A method according to claim 1 wherein said compound is N,N-di-n-butyl(phenylethane)sulfinamide.
15. A method according to claim 1 wherein said compound is N,N-di-n-butylbenzenesulfinamide.
16. A method according to claim 1 wherein said compound is N,N-di-n-butylethanesulfinamide.
17. A method of rendering a surface repellent to birds which comprises applying to said surface at least one compound of the formula

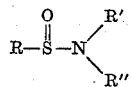

wherein R is selected from the group consisting of alkaryl, aralkyl, aryl and alkyl hydrocarbon radicals containing from 1 to 16 carbon atoms, R' is selected from the group consisting of hydrogen and an alkyl radical containing from 1 to 10 carbon atoms, R" is selected from the group consisting of alkyl radicals containing from 1 to 10 carbon atoms and

wherein R is as previously defined, and wherein R' and R" can, together with the nitrogen, form a heterocyclic ring, in which case the radical comprising the combined R' and R" are selected from the group consisting of

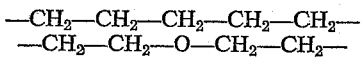
and
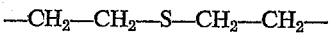

18. A method according to claim 17 wherein there is applied to said surface between one and ten grams of said compound per each 100 square feet of surface.

19. A method of rendering an architectural surface repellent to birds which comprises applying to said surface at least one compound of the formula

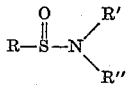

wherein R is selected from the group consisting of alkaryl, aralkyl, aryl and alkyl hydrocarbon radicals containing from 1 to 16 carbon atoms, R' is selected from the group consisting of hydrogen and an alkyl radical containing from 1 to 10 carbon atoms, R" is selected from the group consisting of alkyl radicals containing from 1 to 10 carbon atoms and $$-\overset{O}{\underset{\parallel}{S}}-R$$

wherein R is as previously defined, and wherein R' and R" can, together with the nitrogen, form a heterocyclic ring, in which case the radical comprising the combined R' and R" are selected from the group consisting of

—CH₂—CH₂—CH₂—CH₂—CH₂—
—CH₂—CH₂—O—CH₂—CH₂— and

—CH₂—CH₂—S—CH₂—CH₂—

References Cited in the file of this patent

UNITED STATES PATENTS

| | | |
|---|---|---|
| 2,425,185 | Haury | Aug. 5, 1947 |
| 2,743,209 | Jones et al. | Apr. 24, 1956 |

FOREIGN PATENTS

| | | |
|---|---|---|
| 956,872 | France | Feb. 8, 1950 |
| 738,740 | Germany | Sept. 4, 1943 |